Nov. 20, 1962 R. J. CARLSON 3,065,396
SYSTEM FOR CONTROLLING THE SPEED OF INDUCTION MOTORS
Filed April 21, 1959 2 Sheets-Sheet 1

INVENTOR.
ROBERT J. CARLSON
BY
Flam and Flam
ATTORNEYS.

Nov. 20, 1962

R. J. CARLSON 3,065,396

SYSTEM FOR CONTROLLING THE SPEED OF INDUCTION MOTORS

Filed April 21, 1959

INVENTOR.
ROBERT J. CARLSON
BY
Flam and Flam
ATTORNEYS.

United States Patent Office 3,065,396
Patented Nov. 20, 1962

3,065,396
SYSTEM FOR CONTROLLING THE SPEED
OF INDUCTION MOTORS
Robert J. Carlson, Anaheim, Calif., assignor, by mesne
assignments, to The Emerson Electric Manufacturing
Company, St. Louis, Mo., a corporation of Missouri
Filed Apr. 21, 1959, Ser. No. 807,818
1 Claim. (Cl. 318—229)

This invention relates to a system for automatically maintaining the speed of an induction motor within a narrow range.

Such motors attain speeds near synchronism; nevertheless, the speed attained at any given output torque can be controlled by adjusting the electromotive force applied to the stator windings. Another method involves the use of a wound rotor in place of a squirrel cage rotor, in which an adjustable impedance is included.

It is one of the objects of this invention to make it possible to maintain the speed of such a motor by rapid variation of an impedance that may be in series with the stator or rotor winding. For example, when the impedance is in the stator or primary winding circuit, the value of the impedance may be caused to be quite small or alternately to be quite large. A rapid cycling from one value to the other can be effected by the aid of this invention, and automatically in response to relatively small changes in speed. The introduction of a large impedance slows down the motor; and as soon as the speed is even slightly reduced, the impedance is rapidly reduced so as to cause the motor to speed up.

It is another object of this invention to provide a specific form of impedance, the value of which may be rapidly adjusted, as for example, a saturable rector. In such devices, a direct current coil is use dto saturate the core of the reactor for reducing the impedance. Rapid energization and deenergization of the direct current coils provide the desired rapid changes in the impedance.

It is another object of this invention to control the flow of current in the direct current coil by the aid of a thyratron in series, whereby rapid switching of the direct current can be effected by the use of a control grid. The potential of the grid is made sufficiently positive when the speed falls, to cause the thyratron plate current to flow; and the plate current ceases to flow just as soon as the grid goes negative.

It is still another object of this invention to stabilize the operation of such a system, as for example, to prevent "hunting" and to accelerate the arrival of the grid potential at the required controlling values.

When using the induction motor to drive a variable ratio transmission mechanism, the speed of the motor need be made adjustable only through a very limited range, since the large speed adjustments are effected by the aid of the transmission mechanism. Therefore, the saturable reactors and the induction motor may be of smaller dimensions.

It is still another object of this invention to improve in general, the operation of the thyratron control.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 3 is a wiring diagram of a modified form of the system.

Figure 1:
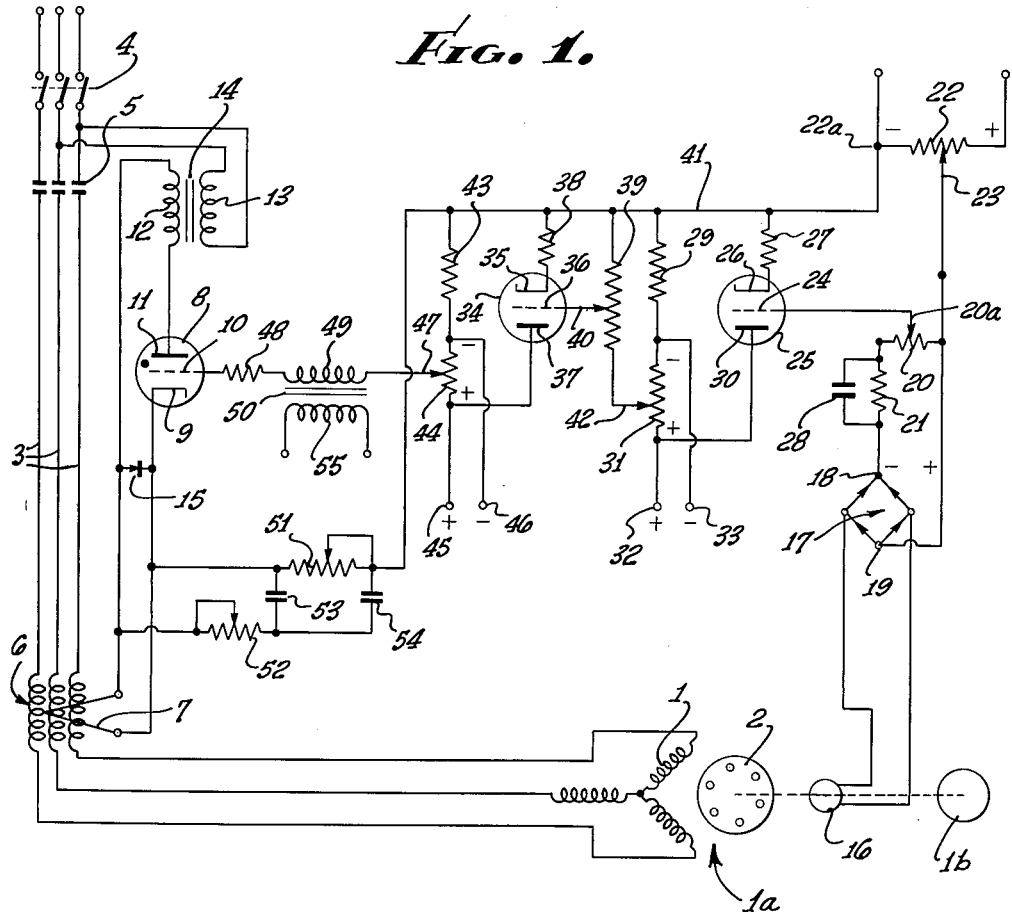
FIGURE 1 is a wiring diagram of a system incorporating the invention.

Referring to FIG. 1, a stator winding 1 is diagrammatically illustrated for a three-phase induction motor 1a. The secondary or rotary squirrel cage winding 2 is also indicated diagrammatically.

Electrical energy is supplied to the stator winding 1 from the three-phase mains 3. A main switch 4 is illustrated; an electromagnetic starting switch 5 is interposed between the main switch 4 and stator 1.

The squirrel cage winding 2 is intended by appropriate design to be one in which there is a considerable amount of slip; by this means, the desired set speed for the motor can be in a relatively wide range with minimum motor frame size, especially adapted for the use of the control system to be hereinafter described. Furthermore, the speed range can be effectively further widened, without excessive increase in motor frame size, by operating the motor through a variable-ratio transmission mechanism 1b, the transmission ratio being simultaneously increased by appropriate gearing as the set desired speed is reduced; by this means, the "torque-multiplying" characteristics of the variable transmission may be used to increase the motor torque capacity at very low speeds.

In order to control the speed of the induction motor 1a, there is included in the mains 3 a saturable reactor 6. This saturable reactor 6 is provided with a direct current winding 7, diagrammatically illustrated. In a well-understood manner, when the direct current winding 7 is energized, the effective impedance of the reactor 6 is greatly reduced. When the winding 7 is deenergized, the impedance produced by the reactor 6 is such as virtually to place the induction motor on open circuit.

The winding 7 is intended to be rapidly energized and deenergized in order to maintain the speed of the rotor 2 at a set point value and within narrow limits. The rate of operation of the winding 7 may be quite high so that even a very small departure below the desired speed will cause the winding 7 to be energized, and when the desired speed is attained or slightly exceeded, the winding 7 is immediately deenergized.

The winding 7 is controlled by a thyratron circuit. A thyratron 8 is shown as having a cathode 9, a control electrode or grid 10 and a plate or anode 11. The plate circuit is in series with the winding 7 and is supplied with pulsating direct current by the aid of the secondary winding 12 of a transformer 14. This secondary winding is fed from a primary winding 13 connected across any two of the mains 3.

When the lower end of the winding 12 is positive, a plate current can flow provided the grid 10 is sufficiently positive with respect to the cathode 9. Usually, the actual positive value required for firing the thyratron 8 is very small. When the current is once established by aid of the grid 10, the thyratron 8 continues active until the plate 11 goes negative. This occurs at the end of the positive half-cycle of potential imposed between cathode 9 and anode 11.

A rectifier 15 bridges the direct current saturating winding 7 so as to provide a path for the direct current when the thyratron 8 ceases operation. While the thyratron is active, the rectifier 15 is incapable of passing current through it, and all of the thyratron current must be conducted through winding 7.

The potential of the thyratron grid 10 is controlled in response to deviation of the speed of the induction motor. For this purpose, a comparison is effected between a set point speed and the speed of the rotor 2. For example, the rotor 2 may directly drive a tachometer alternator 16. This alternator is connected to the input of a full-wave rectifier 17, the output terminals 18 and 19 of which are connected across a resistor 20 through another resistor 21. By the aid of an adjustable tap 20a, any desired portion of the potential difference across the resistor 20 is compared with the potential difference derived from a potentiometer 22 connected to an appropriate direct current source. The adjustable contact member 23 determines the set point for the operation of the system and corresponds to the desired speed of the induction motor.

The potential drop between the tap 20a and the right-hand end of the resistor 20 is matched against the potential drop between the negative terminal 22a of resistor 22 and the contact point 23. This difference is applied to the input circuit of an amplifier 25, there being a grid bias resistor 27 included in the input circuit. Thus, the grid or control electrode 24 is directly connected to tap 20a, and the cathode 26 is connected through the bias resistance 27 to terminal 22a.

A definite potential difference is developed between cathode 26 and control electrode 24 when the rotor 2 operates at the desired speed. When it increases in speed, the potential of grid or electrode 24 is varied in a negative direction. This ultimately results in deenergizing the direct current saturating winding 7 in order to slow down the induction motor 1a.

As soon as the speed of the motor is reduced sufficiently below the desired set speed, the potential of grid 24 again rises, and re-establishes the energizing circuit for the winding 7.

In order that the response of the amplifier 25 be rapid, any change in the output electromotive force of tachometer 16 causes a temporary and rapid change of current through the resistor 20 in one or the other direction. The direction of the change for an increase in speed is such as to augment the effect by temporarily adding a negative potential to grid 24. When the tachometer 16 slows down, the potential of grid 24 is temporarily increased.

For this purpose, a condenser 28 bridges the resistor 21. Assuming that the speed of the motor 1a increases, a heavy charging current temporarily exists in the condenser 28, and this charging current is added to the current in resistor 20, thus increasing rapidly the drop across the resistor. As soon as the capacitor 28 is fully charged, this extra amount of flow through resistor 20 ceases. In other words, the rate of increase of the speed determines the temporarily maximum potential drop across the resistor 20. However, as soon as condenser 28 is fully charged, the current subsides and assumes a value corresponding to the new speed.

Now upon a drop in speed, the condenser 28 is discharged across the resistor 21. This discharging current temporarily reduces the current flowing through resistor 20. For both directions of deviation from the desired speed, there is thus temporarily created an accentuation of change in the voltage drop across resistor 20.

The output circuit of the amplifier 25 includes a load resistor 29 which is connected to the anode or plate 30 of amplifier 25 through the source of plate voltage represented by terminals 32 and 33. A potentiometer resistance 31 is connected across this source.

A second amplifier is adapted to have its input circuit influenced by output circuit of amplifier 25. This amplifier 34 includes a cathode 35, a grid or control electrode 36 and a plate or anode 37.

The input circuit for the amplifier 34 includes a grid-biasing resistor 38 and a portion of a resistor 39 as determined by a tap 40 connected to the grid 36. The resistor 39 is bridged across a conductor 41 and an adjustable portion of the potentiometer resistor 31 as by the aid of a tap 42. By appropriate adjustment of the taps 40 and 42, the desired bias is provided for the grid 36.

The amplifier 34 has an output circuit including a load resistor 43 and a potentiometer resistor 44. This potentiometer resistor is connected across the terminals 45 and 46 of a source of plate potential for the amplifier 34. An adjustable tap 47 connects the control grid 10 of thyratron 8 to a point on the potentiometer resistor 44.

The input circuits for the thyratron 8 thus include a grid-current limiting resistor 48, a secondary winding 49 of a transformer 50, the purpose of which will be explained hereinafter, tap 47, part of resistor 44, load resistor 43, and an adjustable resistor 51.

By appropriate adjustment of the taps 40, 42 and 47, the potential of the thyratron grid 10 will be just sufficient to fire the thyratron 8 when the speed of the induction motor is below a desired value. As soon as the set speed is exceeded by minute amounts, the potential of grid 10 is reduced so as to deenergize the winding 7 and the motor slows down. As the motor slows down by a small amount, the potential of grid 10 is restored and the winding 7 is again energized. This process as hereinabove stated is rapidly repeated.

The resistor 51 is included in an anti-hunt circuit in order to stabilize the thyratron control. The anti-hunting circuit is connected in parallel with the output circuit of the thyratron 8. It includes an adjustable resistor 52. This resistor 52 is connected to plate 11 via the transformer secondary 12. The anti-hunting circuit also includes condensers 53 and 54 connected between the right-hand terminal of the resistor 52, respectively to the left-hand and right-hand terminals of resistor 51.

When the potential difference across the winding 7 is constant, no current can flow through resistor 51 because of the condensers 53 and 54, operating as blocking condensers.

Now let us assume that, due to an increase in the grid potential of the thyratron 8, there is a sudden flow of thyratron current, causing a potential difference to exist across this anti-hunt circuit. This results in a flow of charging current to condenser 53. The potential across this condenser now creates a current flow through resistor 51 and condenser 54, and accordingly there is a drop across resistor 51. This drop being in the input circuit of thyratron 8, is so poled as to reduce or entirely stop the thyratron current. As soon as this occurs, the cycle is repeated.

Thus the anti-hunt circuit "samples" the output of the thyratron 8, and restrains it against too sudden current discharge.

A sudden reduction in the thyratron current causes a reverse action, tending to maintain the output current.

Accordingly, the operation of the thyratron 8 in either direction is stabilized, because the anti-hunt circuit momentarily opposes changes in the thyratron supply output, thus preventing variations in motor speed and providing smooth, stable operation.

By the aid of the transformer 50 having the primary winding 55 and the secondary winding 49, it is possible to obtain more prolonged firing of thyratron 8 than in the usual thyratron circuit. This may be explained by the aid of FIG. 2, which represents a conventional thyratron operation, as well as one in which the transformer 50 is used.

Figure 2:
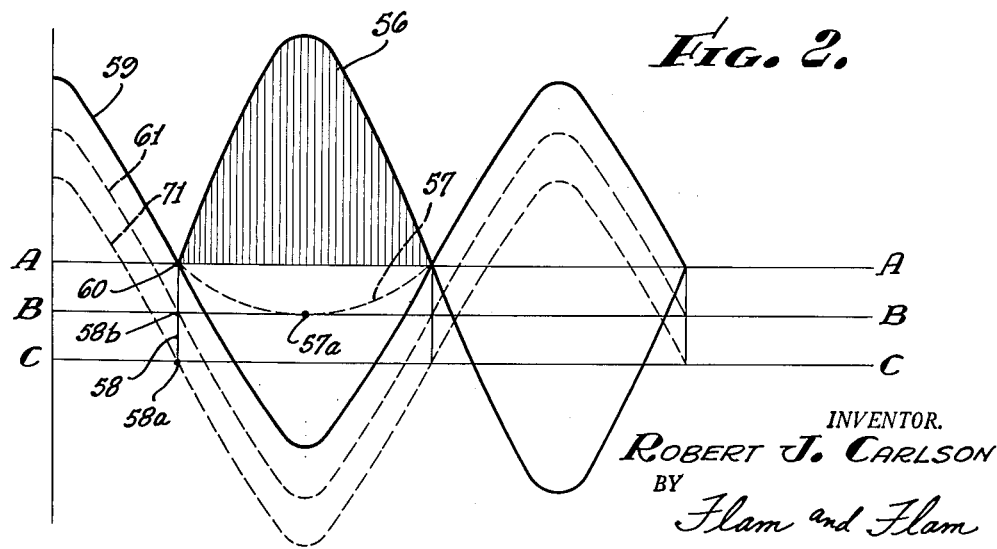
FIG. 2 is a graph illustrating the mode of operation of a thyratron incorporated in the system of FIG. 1.

In FIG. 2, the full sine wave 56 represents one cycle of plate potential imposed between the cathode 9 and the anode 11 of the thyratron 8. This plate potential corresponds to the electromotive force created across the terminals of the secondary winding 12 which supplies the thyratron power.

Horizontal line A, about which curve 56 is symmetrical, corresponds to zero grid voltage of the thyratron. Line B corresponds to that negative value of the grid which is just low enough to fire the thyratron; and line C represents an increased negative grid value, incapable of firing the thyratron.

When the grid voltage reaches the value B, a thyratron fires only when the plate potential of the thyratron reaches a maximum. This corresponds to point 57a of a thyratron grid control locus 57. Accordingly, the second half only of the positive portion of curve 56 corresponds to the period of firing. If this grid potential corresponding to line B is the "no error" potential, the thyratron would be active only for one-half of the positive parts of the sine curve 56.

If the "no error" potential would be set to be at line A, the thyratron would fire at point 60, and the current would flow for an interval corresponding to a complete half-cycle represented by the shaded area of FIG. 2. However, to accomplish this result, the amplifiers 25 and 34 would have to attain a high gain and high sensitivity. By the aid of the superimposed electromotive force of secondary 49 in the thyratron grid circuit, such high gain is rendered unnecessary.

As before discussed, the positive potential corresponding to zero error is represented by the line A. At point 60, the thyratron 8 conducts.

An alternating current rider for the input circuit is provided by secondary coil 49 of transformer 50. The full-line sine wave 59 (the amplitude of which is exaggerated) then corresponds to the grid potential at the control point, due to the alternating current potential across secondary coil 49. It is seen that this line 59 intersects the locus 57 at the beginning of the positive half-wave of the sine curve 56.

The sine wave 59 is symmetrical with respect to line A. When the direct current component of the grid potential is represented by the line B, the grid potential imposed upon the input circuit for the thyratron 8 is represented by the dotted sine wave 61. This wave is symmetrical about line B. At no time does this curve 61 intersect the locus 57; in other words, even a minute lowering of the direct current grid potential below that represented by line B is sufficient to prevent firing.

At a still lower direct current grid potential C, the sine curve 71, symmetrical about line C, represents the instantaneous grid potential; again, there is no intersection of this curve with locus 57.

The vertical line 58 passes through the null points, such as 58a, 58b and 60, of the sine curves 59, 61 and 71.

It is thus seen that when the direct current grid potential corresponding to line A is reached, the thyratron fires on account of the superimposed alternating current which intersects line A at the zero point 60.

To sum up, the form illustrated in FIG. 1 illustrates the use of the alternating current rider in the grid circuit, to make it possible to utilize low-gain amplifiers 25 and 34.

In FIG. 3 a system is indicated in which the thyratron 8 is controlled in the normal manner, but in which the amplifier system is arranged so as to provide the necessary gain.

Two amplifiers 62 and 63 are arranged respectively to amplify the difference of potential corresponding to the position of the contact 23 and the potential determined by the contact 20a. A common resistor 64 is provided in the input circuits of both amplifiers. In this way, the plate current in both amplifiers 62 and 63 flows through this resistor 64 and will produce an increase in the output of the amplifier system, including tubes 62 and 63. This is due to the change in the voltage drop across resistor 64. The effect of this change in voltage drop is to provide an apparent increase in the set voltage corresponding to the position of the tap 23. This increases the correction signal to the thyratron 8 beyond what would be effected by the amplifier 63 alone. Thus, the higher the error, the higher the gain effected by these amplifiers. Accordingly, a stable low-gain system is obtained with the sensitivity and response of a high-gain system.

The output circuit includes terminals 32 and 33 leading to the positive and negative poles of an appropriate source of direct current potential for the anode circuits. The output circuit for amplifier 62 includes a resistor 65 and the output circuit for the amplifier 63 includes a resistor 66. The potential drop across the resistors 65 and 66 in series is impressed upon the input circuit of another amplifier 67, and corresponds to the error in speed. The output of this amplifier 67 is included in the grid circuit of the thyratron 8. By appropriate adjustment of the tap 68 of a potentiometer disposed across the terminals of a source of direct current for the plate circuit of amplifier 67, the potential of grid 10 is made such that it causes firing of the tube 8 as soon as the speed of the induction motor 1a drops below a predetermined limit.

The output circuit also includes the resistor 69, which is also present in the grid circuit of amplifier 67, bridged by a filtering capacitor 70.

In general, the system of FIG. 3 operates in a manner similar to that of FIG. 1. The major differences are the omission of the transformer 50 in a grid circuit of the thyratron 8, and the use of a common mode amplifier system that provides an overall high gain.

The inventor claims:

In a system for controlling the speed of an induction motor having a stator winding and a squirrel cage rotor, the combination therewith of: a saturable reactor electrically connected to the stator winding, said reactor having a direct current saturating winding; a tachometer circuit for sensing the actual speed of the motor by the aid of the tachometer electromotive force; means defining a set point potential corresponding to a desired speed; a circuit supplementing the tachometer circuit, to augment any change in tachometer electromotive force, and corresponding to a rate in change; an amplifier circuit comparing the set point and the tachometer electromotive force; and a thyratron having a control grid, a cathode and an anode; means for causing the control grid to cause the thyratron to feed the saturating winding when the speed of the motor drops below that corresponding to the set point; and an adjustable anti-hunt circuit paralleling the output circuit for preventing any sudden change in the control grid potential, comprising a resistor, a capacitor in series with the resistor, adapted to be charged upon a change in output current, and a shunt across the capacitor, including a second resistor in the input circuit of the thyratron, and a second capacitor in series with the second resistor.

References Cited in the file of this patent

UNITED STATES PATENTS

| | | |
|---|---|---|
| 2,264,333 | Satterlee | Dec. 2, 1941 |
| 2,546,271 | McKenney et al. | Mar. 27, 1951 |
| 2,565,157 | Wickerham et al. | Aug. 21, 1951 |
| 2,568,701 | Arnold | Sept. 25, 1951 |
| 2,600,308 | Lund et al. | June 10, 1952 |
| 2,676,292 | Spencer | Apr. 20, 1954 |
| 2,855,554 | Conger et al. | Oct. 7, 1958 |
| 2,873,417 | Wilkins | Feb. 10, 1959 |
| 2,894,191 | Charbonneaux | July 7, 1959 |